United States Patent
Miyashita

(10) Patent No.: US 10,830,200 B2
(45) Date of Patent: Nov. 10, 2020

(54) CONTROL DEVICE FOR INTERNAL COMBUSTION ENGINE

(71) Applicant: TOYOTA JIDOSHA KABUSHIKI KAISHA, Toyota (JP)

(72) Inventor: Shigeki Miyashita, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/271,905

(22) Filed: Feb. 11, 2019

(65) Prior Publication Data
US 2019/0301419 A1 Oct. 3, 2019

(30) Foreign Application Priority Data
Mar. 27, 2018 (JP) .................. 2018-060495

(51) Int. Cl.
F02N 19/00 (2010.01)
F02N 11/08 (2006.01)

(52) U.S. Cl.
CPC ........ F02N 19/004 (2013.01); F02N 11/0814 (2013.01); *F02N 2200/022* (2013.01); *F02N 2200/023* (2013.01); *F02N 2200/10* (2013.01)

(58) Field of Classification Search
CPC .... F02N 19/00; F02N 19/004; F02N 11/0814; F02N 2200/022; F02N 2200/023; F02N 2200/10
See application file for complete search history.

(56) References Cited

U.S. PATENT DOCUMENTS

2006/0272608 A1* 12/2006 Hara ................... F01L 13/0015
　　　　　　　　　　　　　　　　　　　　　123/182.1
2019/0277240 A1* 9/2019 Miyashita ............. F02N 19/004

FOREIGN PATENT DOCUMENTS

JP 2015-209777 11/2015

* cited by examiner

*Primary Examiner* — Hieu T Vo
(74) *Attorney, Agent, or Firm* — Oblon, McClelland, Maier & Neustadt, L.L.P.

(57) ABSTRACT

A control device for an internal combustion engine is configured to: execute a first decompression operating processing such that a decompression operating state is selected in a first engine speed region that passes in the course of engine stop; execute a decompression stop processing such that a switching from the decompression operating state to a decompression stop state is performed in the course of the engine stop after passage of the first engine speed region; when a temperature correlation value is greater than or equal to a threshold value upon an engine start-up request, execute a second decompression operating processing such that the decompression operating state is selected in a second engine speed region that passes in the course of engine start-up before the start of fuel injection. When the temperature correlation value is smaller than the threshold value, the second decompression operating processing is not executed.

5 Claims, 5 Drawing Sheets

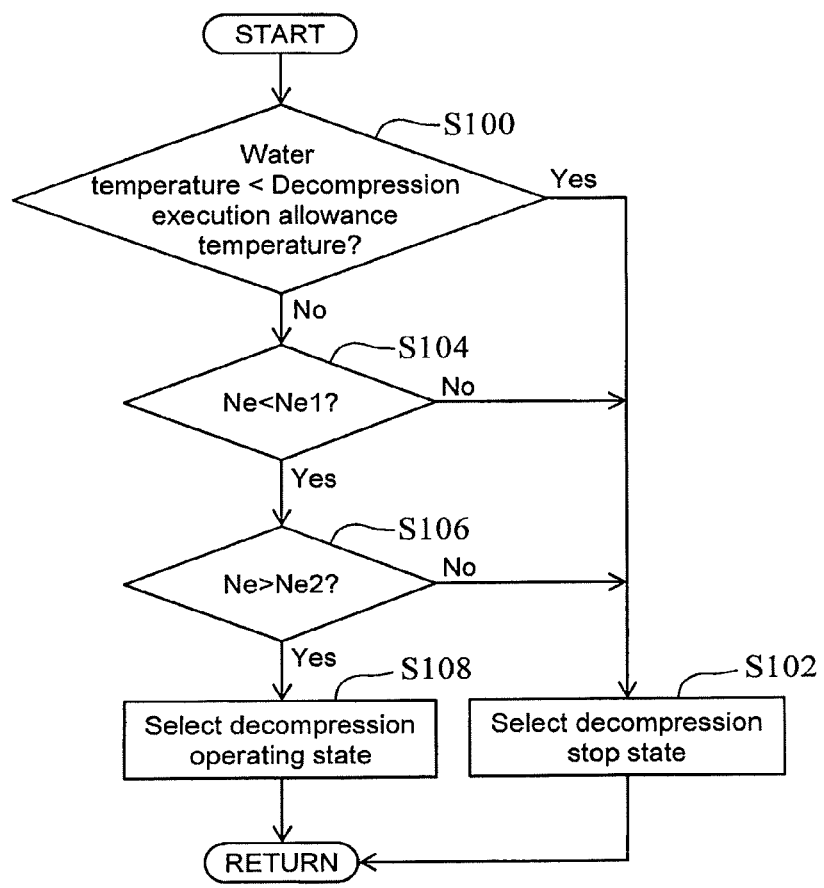

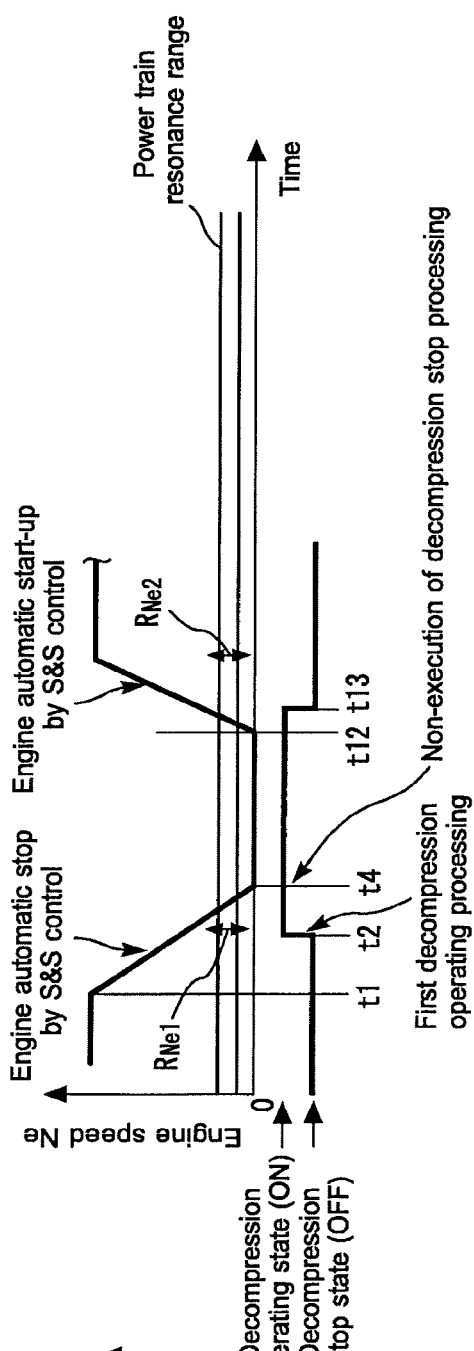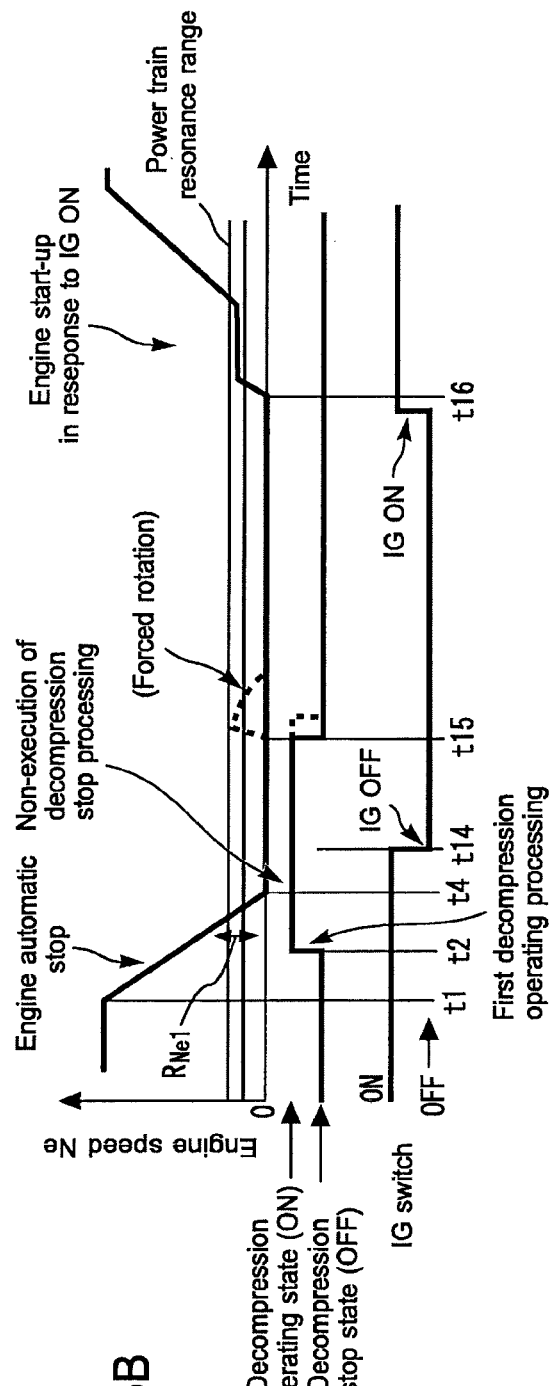

CONTROL DEVICE FOR INTERNAL COMBUSTION ENGINE

CROSS-REFERENCE TO RELATED APPLICATION

This application is based on and claims the benefit of Japanese Patent Application No. 2018-060495, filed on Mar. 27, 2018, which is incorporated by reference herein in its entirety.

BACKGROUND

Technical Field

The present disclosure relates to a control device for an internal combustion engine, and more particularly to a control device for controlling an internal combustion engine equipped with a decompression device for releasing compression pressure in a cylinder.

Background Art

An internal combustion engine provided with a decompression device (also called a pressure reducing device) for releasing compression pressure in a cylinder .is known. This kind of decompression device is configured to be able to select between a state in which a decompression operation to release the compression pressure in the cylinder is performed (hereunder, referred to as a "decompression operating state") and a state in which the decompression operation described above is not performed even if a crankshaft is rotating (hereunder, referred to as a "decompression stop state").

For example, JP 2015-209777 A discloses a control device for an internal combustion engine that includes a decompression device as described above. This control device controls the decompression device such that, when an engine automatic stop (i.e., intermittent stop) by an S&S (Stop and Start) control (also called an idling stop control) is performed during execution of the S&S control, the decompression operating state is selected.

SUMMARY

If an engine stop is completed in the decompression operating state described above and thereafter, an engine start-up is performed while keeping the decompression operating state, it is required to perform switching from the decompression operating state to the decompression stop state before starting fuel injection in order to avoid an engine start-up problem.

However, there is a possibility that, when an engine start-up is performed while the temperature of the decompression device is low, the decompression device may not favorably operate. If, as a result, the switching to the decompression stop state cannot be performed at the engine start-up or a timing of completion of the switching to the decompression stop state is delayed, there is a concern that the engine start-up may fail or be delayed.

The present disclosure has been made to address the problem described above, and an object of the present disclosure is to provide a control device for an internal combustion engine that can use a decompression device while preventing or reducing a decrease of the engine startability.

A control device for controlling an internal combustion engine according to the present disclosure is configured to control an internal combustion engine that includes a decompression device configured to select between a decompression operating state in which a decompression operation that releases compression pressure in a cylinder is performed and a decompression stop state in which the decompression operation is not performed.

The control device is configured to:

(a) execute a first decompression operating processing that, controls the decompression device such that the decompression operating state is selected in a first engine speed region included in an engine speed region that passes in a course of engine stop;

(b) execute a decompression stop processing that controls the decompression device such that a switching from the decompression operating state to the decompression stop state is performed in the course of the engine stop after passage of the first engine speed region or in an engine stop time after the course of the engine stop;

(c) when a temperature correlation value correlated with temperature of the decompression device is greater than or equal to a threshold value upon an engine start-up request being issued, execute a second decompression operating processing that controls the decompression device such that the decompression operating state is selected in a second engine speed region included in an engine speed region that passes in a course of engine start-up before a start of fuel injection; and (d) when the temperature correlation value is smaller than the threshold value upon the engine start-up request being issued, cause the second decompression operating processing not to be executed.

The decompression stop processing may be executed where the internal combustion engine is stopped in response to a request to stop a vehicle system from a driver of a vehicle on which the internal combustion engine is mounted.

The control device may be configured to: (e) execute an engine automatic stop processing that stops the internal combustion engine when an automatic stop condition is met; and (f) after the internal combustion engine is stopped by the engine automatic stop processing, control the decompression device such that the decompression operating state is maintained in an engine stop time without performing the decompression stop processing.

The control device may be configured, where a request to stop a vehicle system from a driver of a vehicle on which the internal combustion engine is mounted is issued in an engine stop time after stopping the internal combustion engine by the engine automatic stop processing, to control the decompression device such that a switching from the decompression operating state to the decompression stop state is performed.

At least one of the first engine speed range and the second engine speed range may include a power train resonance range.

According to the control device for an internal combustion engine of the present disclosure, the first decompression operating processing is executed in the course of engine stop, and then, the decompression stop processing is executed in the course of the engine stop or in a subsequent engine stop time. As a result, the decompression stop state is maintained during the engine stop time. Also, when the temperature correlation value correlated with the temperature of the decompression device is smaller than the threshold value upon an engine start-up request being issued thereafter, the second decompression operating processing for performing a switching from the decompression stop state to the decompression operating state in the course of engine start-up is not executed. This can avoid an engine star-up from being performed with the decompression operating state selected in such a cold temperature that the decompression device may not favorably operate. As just described, an engine start-up problem caused by operation failure of the decompression devices due to cold temperature can be reduced. Therefore, according to the control device of the present disclosure, the decompression device can be used while reducing a decrease of the engine startability.

BRIEF DESCRIPTION OF THE DRAWINGS

FIG. 4 is a flow chart that illustrates a routine of the processing concerning the control of the decompression device according to the first embodiment of the present disclosure;

FIGS. 5A and 5B are time charts that schematically illustrate the operation of control of the decompression device according to a second embodiment of the present disclosure.

DETAILED DESCRIPTION

In the following, embodiments of the present disclosure will be described with reference to the accompanying drawings. However, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

First Embodiment

Firstly, a first embodiment according to the preset disclosure will be described with reference to FIGS. 1 to 4.

1-1. Example of Configuration of Vehicle System

Figure 1:
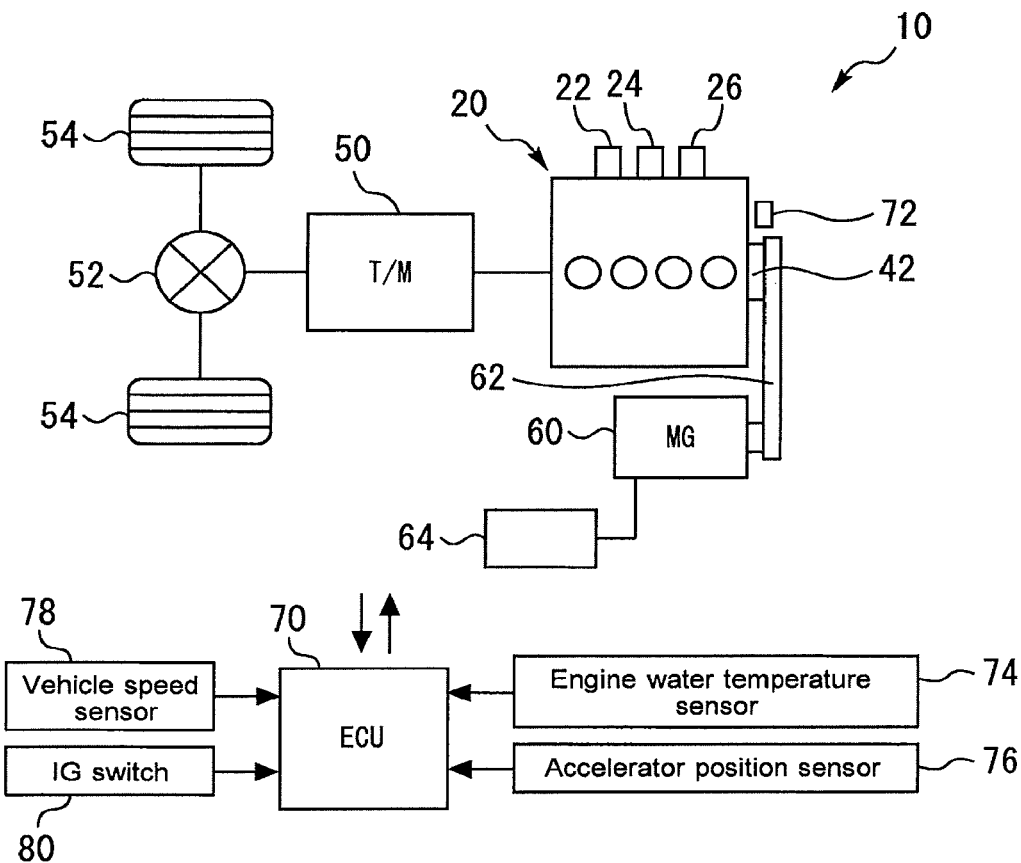
FIG. 1 is a schematic diagram for describing an example of the configuration of a vehicle system according to a first embodiment of the present disclosure.

FIG. 1 is a schematic diagram for describing an example of the configuration of a vehicle system according to the first embodiment of the present disclosure. The vehicle system shown in FIG. 1 is provide with a vehicle 10. The vehicle 10 is configured to be able to perform an S&S (Stop and Start) control (also called an idling stop control) as described below.

1-1-1. Hardware Configuration

The vehicle 10 is provided with an internal combustion engine 20 as its power source. As an example, the internal combustion engine 20 is a spark ignition in-line four-cylinder engine. However, an internal combustion engine according to the present disclosure may alternatively be a compression ignition engine, and the number and arrangement of cylinders thereof are not particularly limited.

The internal combustion engine 20 is equipped with fuel injection valves 22 and an ignition device 24. Each of the fuel injection valves 22 is arranged for the corresponding cylinder, and, as an example, injects fuel directly into the corresponding cylinder. The ignition device 24 ignites an air-fuel mixture in each cylinder by the use of a spark plug arranged for each cylinder. Furthermore, the internal combustion engine 20 is provided with a decompression device 26.

Figure 2:
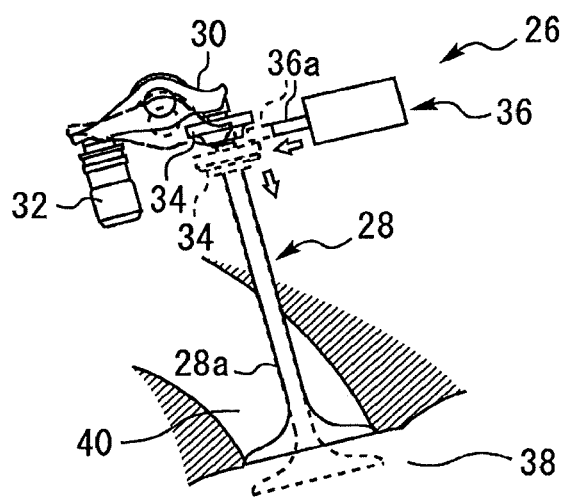
FIG. 2 is a schematic diagram for describing an example of the concrete configuration of a decompression device shown in FIG. 1.

FIG. 2 is a schematic diagram for describing an example of the concrete configuration of the decompression device 26 shown in FIG. 1. FIG. 2 illustrates an intake valve 28, a rocker arms 30 that transmits the pressing force of a cam (not shown) to the intake valve 28, and a lash adjustor 32 that supports the rocker arm 30 at its end portion located on the non-valve side. The intake valve 28 is urged, by a valve spring (not shown), in its closing direction (that is, in a direction to push up the rocker arm 30). A retainer 34 for supporting the valve spring is fixed to an end portion of a valve shaft 28a of the intake valve 28 located on the side of the rocker arm 30.

The decompression device 26 is equipped with an actuator 36 as shown in FIG. 2, for each cylinder. The actuator 36 includes a pin 36a that can protrude toward the intake valve 28. The actuator 36 is a hydraulic type or an electromagnetic solenoid type. If a plurality of intake valves 28 are provided per cylinder, the pin 36a may be provided for any one of the plurality of intake valves 28 in each cylinder, and alternatively be provided for each of the plurality of intake valves 28.

The pin 36a is protruded when the intake valve 28 is lifting, and is engaged with the retainer 34 as shown in FIG. 2. Because of this, the intake valve 28 can be caused to remain open regardless of application of the pressing force of the cam to the rocker arm 30. Since, as a result, a combustion chamber 38 of each cylinder of the internal combustion engine 20 and an intake air passage 40 thereof can always communicate with each other, in-cylinder pressure during the compression stroke (that is, compression pressure) can be released in each cylinder. Hereunder, an operation to release the compression pressure in each cylinder in this way is referred to as a "decompression operation".

According to the decompression device 26 configured as described above, a "decompression operating state" in which the decompression operation is performed is achieved by actuating the pin 36a to engage it with the retainer 34. On the other hand, a "decompression stop state" in which the decompression operation is not performed (even when a crankshaft 42 is rotating) is achieved by releasing the engagement between the retainer 34 and the pin 36a. As just described, the decompression device 26 can select one of the decompression operating state and the decompression stop state by controlling the actuator 36.

It should be noted that the concrete configuration of the decompression device according to the present disclosure is not limited to the example shown in FIG. 2. That is to say, a decompression device having any other known configuration can be adopted, as long as the compression pressure in the cylinder can be released.

The torque generated by the internal combustion engine 20 is transmitted to drive wheels 54 via a transmission 50 and a differential gear 52. The vehicle 10 is provided with a motor generator (hereafter, also referred to as an "MG") 60. The MG 60 is coupled to the crankshaft 42 via, for example, a belt 62. The MG 60 is electrically connected to a battery 64. The MG 60 serves as a generator to convert, into an electric power, the torque of the crankshaft 42 generated as a result of combustion. The electric power generated by the MG 60 is stored in the battery 64. The MG 60 also serves as an electric motor configured to rotate to drive the crankshaft 42 by means of the electric power of the battery 64.

As shown in FIG. 1, the system according to the present embodiment is further provided with an electronic control unit (ECU) 70. Various sensors installed in the internal combustion engine 20 and the vehicle 10 on which the internal combustion engine 20 is mounted and also various actuators for controlling the operation of the internal combustion engine 20 and the vehicle 10 are electrically connected to the ECU 70.

The various sensors described above include a crank angle sensor 72, an engine water temperature sensor 74, an accelerator position sensor 76 and a vehicle speed sensor 78. The crank angle sensor 72 outputs a signal responsive to crank angle. The ECU 70 can calculate an engine speed Ne by the use of the signals of the crank angle sensor 72. The engine water temperature sensor 74 outputs a signal responsive to engine water temperature. The accelerator position sensor 76 outputs a signal responsive to the position of an accelerator pedal of the vehicle 10. The vehicle speed sensor 78 outputs a signal responsive to the speed of the vehicle 10. In addition, the various actuators described above include the fuel injection valves 22, the ignition device 24, the decompression devices 26 (actuators 36) and the MG60 that are described above. Furthermore, an ignition switch (IG switch) 80 for the driver of the vehicle 10 to issue a start-up request of the vehicle system and a stop request thereof is electrically connected to the ECU 70.

The ECU 70 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved.

1-1-2. Stop and Start of Internal Combustion Engine

According to the vehicle 10 having the configuration described above, the operation of the internal combustion engine 20 is stopped when the driver turns OFF the IG switch 80 (i.e., when a stop request of the vehicle system is issued), and is started on the condition that, when the driver turns ON the IG switch 80 (i.e., when a start-up request of the vehicle system is issued), other engine start-up conditions are met. Moreover, during execution of the S&S control described above, the operation of the internal combustion engine 20 is stopped when a predetermined automatic stop condition is met (which corresponds to "engine automatic stop processing"), and is started (restarted) when a predetermined automatic start-up condition is met.

It should be noted that the automatic stop condition includes, for example, a requirement that the vehicle speed is zero, a requirement that the accelerator pedal is not depressed, a requirement that the engine speed Ne is lower than or equal to a predetermined value, and a requirement that the engine water temperature is higher than or equal to a predetermined value (for example, a requirement that the warm-up of the internal combustion engine 20 is completed). In addition, the automatic start-up condition is, for example, met when depression of the accelerator pedal is detected during a temporal stop of the vehicle 10.

1-2. Control of Decompression Device According to First Embodiment

According to the internal combustion engine 20 equipped with the decompression devices 26, advantageous effects, such as reduction of the vibration and noise of the internal combustion engine 20, can be achieved by selecting the decompression operating state in the "course of engine stop" associated with an engine stop request (based on IG switch OFF, or satisfaction of the automatic stop condition). Moreover, in response to an engine start-up request (based on IG switch ON, or satisfaction of the automatic start-up condition), advantageous effects, such as reduction of the vibration and noise of the internal combustion engine 20, can be achieved by similarly selecting the decompression operating state in the "course of engine start-up" before the start of fuel injection. Furthermore, as a result of the decompression operating state being selected in the course of the engine start-up, the compression load of the internal combustion engine 20 is decreased. Because of this, reduction of power consumption of the battery 64 can also be achieved.

It should be noted that the course of the engine stop mentioned here refers to a time period from the start of fuel cut for an engine stop to the completion of the engine strop (i.e., engine speed Ne=zero). In addition, the course of the engine start-up refers to a time period from the start of cranking to the start of fuel injection.

In order to avoid an engine start-up problem when an engine start-up is performed while maintaining the decompression operating state already selected in the course of the engine stop, it is required to perform the switching from the decompression operating state to the decompression stop state before the start of fuel injection. However, if the engine start-up is performed under the condition that the temperature of the decompression devices 26 is low because of the outside air temperature being low, there is a possibility that the decompression devices 26 may not favorably operate.

To be more specific, under extremely-low outside air temperatures, the viscosity of various types of oils used in the vehicle 10 may increase, the electric voltage of the battery 64 may decrease, or the decompression devices 26 may freeze. As a result, there is a possibility that, if the actuators 36 are a hydraulic type or an electro-magnetic solenoid type using the electric power of the battery 64, or the decompression devices 26 are frozen, the switching from the decompression operating state to the decompression stop state may not be favorably performed. There is a concern that, if, due to this kind of reasons, the switching to the decompression stop state cannot be performed at the engine start-up or a timing of completion of the switching to the decompression stop state is delayed, the engine start-up may fail or be delayed.

1-2-1. Outline of Control of Decompression Device

Figure 3:
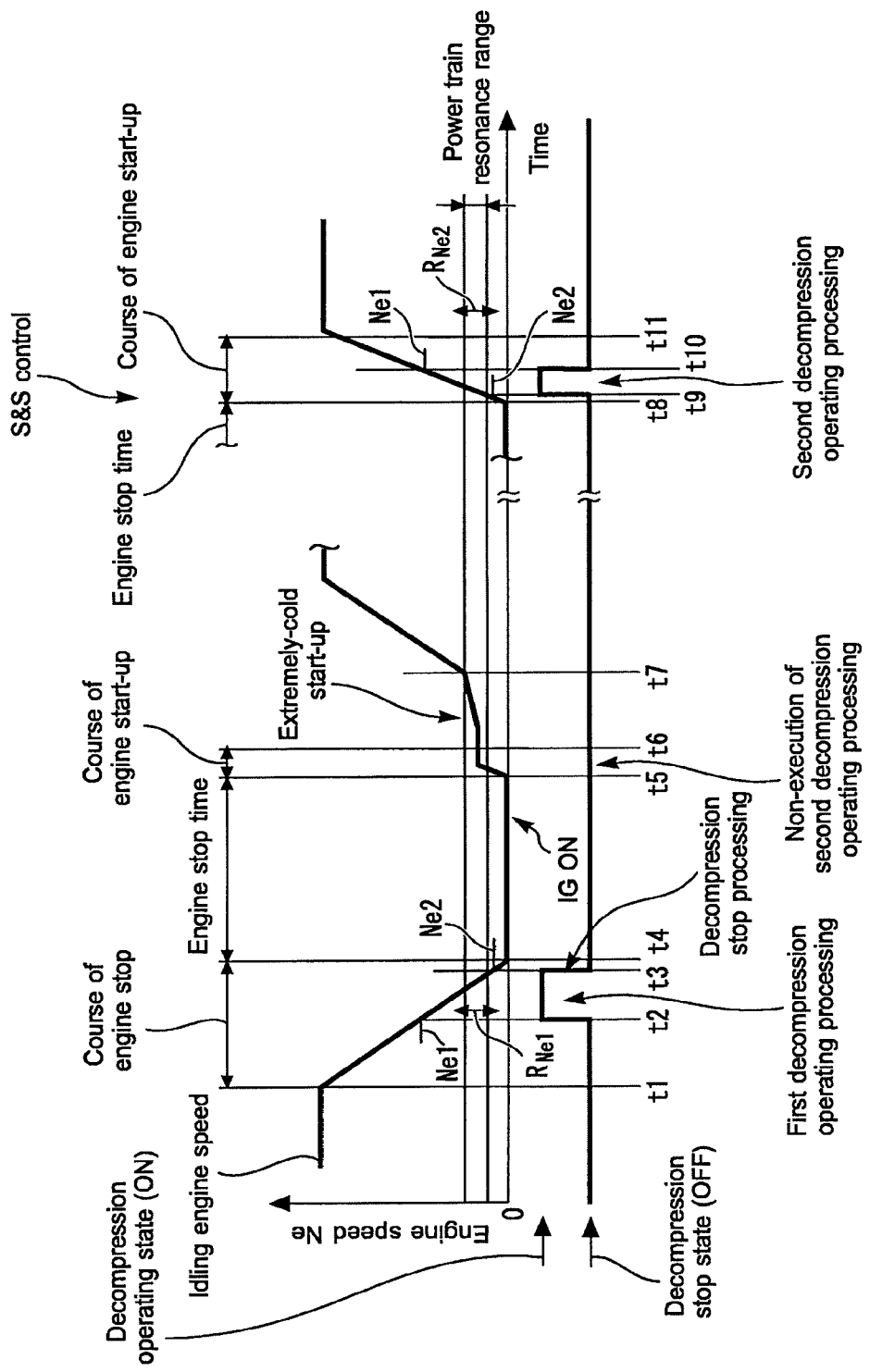
FIG. 3 is a time chart that schematically illustrates the operation by control of the decompression device according to the first embodiment of the present disclosure.

FIG. 3 is a time chart that schematically illustrates the operation by the control of the decompression device 26 according to the first embodiment of the present disclosure.

A time point t1 in FIG. 3 corresponds to a time point at which a fuel cut has been started in response to an engine stop request based on the IG switch OFF. As a result of the fuel cut being executed for the engine stop, the engine speed Ne decreases from an idling engine speed toward zero as shown in FIG. 3. It should be noted that a time period from the time point t1 to a time point t4 of completion of the engine stop corresponds to an example of the "course of engine stop" according to the present disclosure.

The control of the decompression devices 26 includes a "first decompression operating processing" directed to the course of the engine stop. According to the first decompression operating processing, the decompression devices 26 are controlled such that the decompression operating state is selected in a "first engine speed range $R_{Ne1}$" included in an engine speed range that passes in the course of the engine stop. It should be noted that, as exemplified below, the first engine speed range $R_{Ne1}$ may be a part of the engine speed range that passes in the course of the engine stop, or may be the whole thereof.

As shown in FIG. 3, there is a power train resonance range in a low-speed range of the internal combustion engine 20, and the vibration and noise of the internal combustion engine 20 become easy to be produced during passage of this power train resonance range. Accordingly, in the present embodiment, in order to effectively reduce the vibration and noise of the internal combustion engine 20 at an engine stop, the first engine speed range $R_{Ne1}$ is set so as to include this power train resonance range. It should be noted that the power train mentioned here corresponds to an internal combustion engine and a power transmission device (which is a device to transmit the power generated by the internal combustion engine to the drive wheels of the vehicle). In the example of the vehicle 10 shown in FIG. 1, the internal combustion engine 20 and a power transmission device interposed between the internal combustion engine 20 and the drive wheels 54 (which includes the transmission 50 and the differential gear 52) corresponds to the power train.

A time point t2 in FIG. 3 corresponds to a time point at which the control of the decompression devices 26 has been started such that the decompression operating state is selected. The decompression devices 26 having the configuration shown in FIG. 2 require the rotation of the crankshaft 42 (i.e., the operation of lifting of intake valve 28) in order to perform the switching from the decompression stop state to the decompression operating state. Because of this, the control of the decompression devices 26 for achieving the decompression operating state in each cylinder before the engine speed Ne is reached to the upper limit of the power train resonance range (i.e., the operation to engage the pin 36a of the actuator 36 for each cylinder with the corresponding retainer 34) is started at the time point t2 before the upper limit engine speed of the power train resonance range arrives (i.e., at a time point at which an engine speed threshold value Ne1 described later arrives). In the example shown in FIG. 3, the decompression operating state is maintained until a time point t3 after arrival of the lower limit engine speed of the power train resonance range (i.e., until a time point at which an engine speed threshold value Ne2 described later arrives).

The control of the decompression devices 26 includes a "decompression stop processing". According to the decompression stop processing, the decompression devices 26 are controlled such that the switching from the decompression operating state to the decompression stop state is performed in the course of the engine stop after passage of the first engine speed range $R_{Ne1}$ or in an engine stop time after the end of the course of the engine stop. In the example shown in FIG. 3, the decompression stop processing is executed at the time point t3 in the course of the engine stop.

To be more specific, the decompression stop processing by the decompression devices 26 having the configuration shown in FIG. 2 corresponds to an operation to release the engagement between the pin 36a and the retainer 34 for the actuator 36 at each cylinder. If the engagement between the pin 36a and the retainer 34 is released, the intake valve 28 is closed by the biasing force of the valve spring. It should be noted that, in the example of a decompression device having the configuration that does not require an engine rotation to perform the switching from the decompression operating state to the decompression stop state similarly to the decompression device 26, the decompression stop processing may be executed in the engine stop time, instead of the example described above.

Moreover, as shown in FIG. 3, in the engine stop time after the course of the engine stop, the decompression stop state is maintained since the operation of the actuator 36 is not performed. As just described, executing the decompression stop processing described above can properly handle the situation in which the engine start-up is performed thereafter in an engine soak under an extremely low outside air temperature.

A time point t5 corresponds to a time point at which cranking is started in response to an engine start-up request based on an ON operation of the IG switch 80 by the driver. A time point t6 corresponds to a time point at which fuel injection is started, during execution of the cranking, at a cylinder at which the fuel injection is to be performed first. In response to the start of combustion in each cylinder, the engine speed Ne increases. A time point t7 corresponds to a time point of completion of the start of the combustion in all the cylinders. After the time point t7 elapses, the engine speed Ne increases toward the idling engine speed. A time period from the time point t5 to the time point 6 corresponds to an example of the "course of engine start-up" according to the present disclosure.

As described above, according to the control of the present embodiment, the decompression devices 26 are maintained in the decompression stop state during the engine stop time. Because of this, at the time point t5 of the start of the course of the engine start-up, the decompression devices 26 are in the decompression stop state. According to the present embodiment, which of the decompression operating state and the decompression stop state is selected in the course of the engine start-up is determined in accordance with the engine water temperature. The engine water temperature used here corresponds to an example of the "temperature correlation value" correlated with the temperature of the decompression device according to the present disclosure.

Specifically, when the engine water temperature is higher than or equal to a decompression execution allowance temperature, such as −20 degrees C., (also referred to as a "time of non-extremely-cold start-up") upon an engine start-up request being issued, a "second decompression operating processing" is executed. According to the second decompression operating processing, the decompression devices 26 are controlled such that the decompression operating state is selected in a "second engine speed range $R_{Ne2}$" included in an engine speed range that passes in the course of the engine start-up.

In the example shown in FIG. 3, the second engine speed range $R_{Ne2}$ is set so as to include the power train resonance range similarly to the first engine speed range $R_{Ne1}$. Because of this, when the non-extremely-cold start-up is performed, the second decompression operating processing is executed (see time points t9 to t10 described later), whereby the decompression operating state is used during passage of the power train resonance range in the course of the engine start-up similarly to the course of the engine stop. It should be noted that the second engine speed range $R_{Ne2}$ may be the whole engine speed ranges that passes in the course of the engine start-up, instead of the example shown in FIG. 3.

When, on the other hand, the engine water temperature is lower than the decompression execution allowance temperature (also referred to as a "time of extremely-cold start-up") upon an engine start-up request being issued as a result of the IG switch being turned ON, the second decompression operating processing is not executed (see the time points t5 to t6). That is to say, the decompression stop state is maintained also in the course of the engine start-up. It should be noted that the extremely-cold start-up refers to an engine start-up from when the individual temperatures of the vehicle 10 are stable at temperatures equivalent to the extremely-low outside air temperature (i.e., when the engine water temperature is lower than the decompression execution allowance temperature). In addition, the decompression execution allowance temperature corresponds to an example of the "threshold value" according to the present disclosure.

Furthermore, in the example shown in FIG. 3, an engine stop is performed in response to the automatic stop condition being met during execution of the S&S control, and then, an engine start-up (restart) is performed in response to the automatic start-up condition being met. A time point t8 corresponds to a time point of start of the cranking at this engine automatic start-up. It should be noted that, even in the course of the engine stop in response to the automatic stop condition being met, the first decompression operating processing is similarly performed and the decompression stop processing is similarly performed thereafter, although illustration thereof is omitted in FIG. 3.

It is difficult to predict a timing at which an engine start-up request based on the IG switch ON by the driver is issued. If, on the other hand, the engine automatic stop by the S&S control has already been performed, it is conceivable that a restart (i.e., engine automatic start-up) will be performed within a certain time period (for example, when the engine automatic start-up is performed in response to a switching from a red light to a green light after the vehicle 10 is stopped at the red light and the engine automatic stop is performed). In addition, the example of the automatic stop condition described above includes a requirement that the warm-up of the internal combustion engine 20 is completed. Because of this, the engine automatic stop by the S&S control described above is performed after the engine warm-up is completed. It is therefore conceivable that the engine water temperature obtained when the engine automatic start-up request is issued does not become lower than the decompression execution allowance temperature.

Accordingly, since the course of the engine start-up from the time point t8 by the S&S control corresponds to a non-extremely-cold start-up, the second decompression operating processing is executed. In detail, at the time point t9 at which the engine speed Ne is reached to an engine speed threshold value Ne2, the second decompression operating processing is started. That is to say, the second decompression operating processing is executed such that, the decompression operating state is achieved during passage of the power train resonance range also in this course of the engine start-up. The time point t10 corresponds to a time point at which the switching from the decompression operating state to the decompression stop state is completed in each cylinder after passage of the power train resonance range.

It should be noted that a time point t11 corresponds to a time point at which fuel injection is started at a cylinder at which the fuel injection is to be performed first during execution of the cranking. In response to the start of the fuel injection in each cylinder, combustion is started in each cylinder, and the engine speed Ne increases toward the idling engine speed. In addition, the reason why the values of the engine speed Ne that have increased by the cranking are different between the time of the extremely-cold start-up and the engine start-up time by the S&S control is that the engine friction or the output of the MG 60 differs due to a difference of the engine water temperature at the engine start-up request. Additionally, the engine water temperature before an engine start-up is equivalent to the temperatures of the individual portions of the vehicle 10.

1-2-2. Processing of ECU Concerning Control of Decompression Device

FIG. 4 is a flow chart that illustrates a routine of the processing concerning the control of the decompression device 26 according to the first embodiment of the present disclosure. The ECU 70 repeatedly executes the present routine at a predetermined time interval during operation of the internal combustion engine 20.

According to the routine shown in FIG. 4, firstly, the ECU 70 determines whether or not the engine water temperature detected by the engine water temperature sensor 74 is lower than the decompression execution allowance temperature described above (step S100).

If the determination result of step S100 is positive (engine water temperature<decompression execution allowance temperature), the ECU 70 controls the decompression devices 26 such that the decompression stop state is selected (step S102). It should be noted that, if the processing proceeds to step S102 when the decompression stop state is already selected, the decompression stop state is maintained.

If, on the other hand, the determination result of step S100 is negative (engine water temperature≥decompression execution allowance temperature), the ECU 70 proceeds to step S104. In step S104, the ECU 70 determines whether or not the engine speed Ne is lower than the engine speed threshold value Ne1 described above. As an example, the engine speed threshold value Ne1 is set as a value that is higher than the upper limit engine speed of the power train resonance range as shown in FIG. 3.

If the determination result of step S104 is negative (Ne≥Ne1), the ECU 70 proceeds to step S102 to select the decompression stop state. If, on the other hand, the determination result of step S104 is positive (Ne<Ne1), the ECU 70 proceeds to step S106.

In step S106, the ECU 70 determines whether or not the engine speed Ne is higher than an engine speed threshold value (Ne<Ne2). As an example, the engine speed threshold value Ne2 is set as a value that is lower than the lower limit engine speed of the power train resonance range as shown in FIG. 3.

If the determination result of step S106 is positive (Ne>Ne2), the ECU 70 proceeds to step S108. In step S108, the ECU 70 controls the decompression devices 26 such that the decompression operating state is selected. It should be noted that, if the processing proceeds to step S108 when the decompression operating state is already selected, the decompression operating state is maintained. If, on the other hand, the determination result of step S106 is negative (Ne≤Ne2), the ECU 70 proceeds to step S102 to select the decompression stop state.

1-2-3. Advantageous Effects Concerning Control of Decompression Device

According to the processing of the routine shown in FIG. 4 described so far, where the engine water temperature is higher than or equal to the decompression execution allowance temperature, the decompression operating state is selected when the engine speed Ne is within a predetermined engine speed range (Ne2-Ne1) including the power train resonance range, and the decompression stop state is selected when the engine speed Ne is not within the engine speed range (Ne2-Ne1). Thus, where the engine water temperature is higher than or equal to the decompression execution allowance temperature, the decompression devices 26 are controlled as follows during transition from the course of the engine stop to the course of the engine start-up through the engine stop time.

That is to say, the first decompression operating processing is executed in the course of the engine stop, whereby the decompression operating state is achieved during passage of the power train resonance range. The decompression stop processing is executed thereafter, whereby the decompression stop state is maintained during the engine stop time. Also, the second decompression operating processing is executed thereafter in the course of the engine start-up (i.e., at the time of non-extremely-cold start-up), whereby the decompression operating state is achieved during passage of the power train resonance range. It should be noted that, after the end of the course of the engine start-up, the decompression stop state is maintained until the next engine stop is performed.

On the other hand, according to the processing of the routine described above, where the engine water temperature is lower than the decompression execution allowance temperature, the decompression stop state is continuously selected. Thus, if an engine stop is performed in response to the IG switch OFF by the driver, and an engine start-up is then performed after the engine water temperature becomes lower than the decompression execution allowance temperature during the engine stop time (that is, an extremely-cold start-up is then performed), the fuel injection is performed after finishing the course of the engine start-up in the decompression stop state which is maintained from the engine stop time. In other words, the extremely-cold start-up is avoided from being performed with the decompression operating state selected. Therefore, even if the decompression devices 26 do not favorably operate due to the temperature of the decompression devices 26 being low during the engine stop time, an engine start-up problem (engine start-up failure or engine start-up delay) due to operation failure of the decompression devices 26 can be reduced.

As described so far, according to the control of the decompression devices 26 of the present embodiment, the decompression devices 26 can be used for the reduction of the vibration and noise of the internal combustion engine 20 while reducing a decrease of the engine startability.

Furthermore, according to the control of the decompression devices 26 of the present embodiment, the decompression devices 26, if the decompression operating state is selected in the course of the engine stop and the course of the engine start-up, the decompression operating state is used in the power train resonance range. Therefore, the reduction of the vibration and noise of the internal combustion engine 20 by the use of the decompression devices 26 can be effectively performed.

Second Embodiment

Next, a second embodiment according to the present disclosure will be described with reference to FIGS. 5A, 5B and 6. It is supposed that, in the following description, the configuration shown in FIG. 1 is used as an example of the configuration of a vehicle system according to the second embodiment.

2. Control of Decompression Device According to Second Embodiment

2-1. Outline of Control of Decompression Device

FIGS. 5A and 5B are time charts that schematically illustrate the operation of the control of the decompression device 26 according to the second embodiment of the present disclosure. FIG. 5A represents an example in which the engine automatic stop and engine automatic start-up by the S&S control is performed. On the other hand, FIG. 5B represents an example in which the IG switch 80 is turned OFF in the engine stop time after the engine automatic stop by the S&S control and the engine start-up is performed thereafter in response to the IG switch ON. It should be noted that time points t1, t2 and t4 in FIGS. 5A and 5B are the same as the time points t1, t2 and t4 in FIG. 3.

According to the control of the decompression devices 26 of the first embodiment described above, under the condition that the engine water temperature is higher than or equal to the decompression execution allowance temperature, the switching of the control state of the decompression devices 26 is executed as follows with regard to a set of engine stop and engine start-up. That is to say, after the decompression operating state is selected in the course of the engine stop, the switching to the decompression stop state is performed. Thereafter, the decompression operating state is selected again in the course of the engine start-up, and then, the switching to the decompression stop state is performed again. In addition, the above-described condition (engine water temperature>decompression execution allowance temperature) is also met when the engine automatic stop and engine automatic start by the S&S control is performed. Thus, there is a concern that, if the engine automatic stop (i.e., intermittent stop) by the S&S control is often performed, the number of times of switching of the control state of the decompression devices 26 may be increased unnecessarily.

As already described, it is conceivable that, if the engine automatic stop by the S&S control is performed, restart (engine automatic start) is performed in a certain time period. Accordingly, in the present embodiment, during execution of the S&S control, basically (in other words, as long as the IG switch 80 is not turned OFF in the engine stop time), the control of the decompression devices 26 is performed as in an example shown in FIG. 5A described below.

Specifically, in the example shown in FIG. 5A, contrary to the example shown in FIG. 3, the switching to the decompression stop state (i.e., decompression stop processing) is not performed after passage of the power train resonance range in the course of the engine stop. As a result, during the engine stop time, the decompression operating state is maintained. If the automatic start request is issued thereafter, the course of the engine start-up is started at a time point t12 while maintaining the decompression operating state. In addition, at a time point t13 after passage of the power train resonance range thereafter, the switching from the decompression operating state to the decompression stop state is performed.

An example shown in FIG. 5B is the same as the example shown in FIG. 5A in terms of the switching to the decompression stop state is not performed after passage of the power train resonance range in the course of the engine stop. On that basis, in the example shown in FIG. 5B, a time point t14 in the engine stop time, the IG switch 80 is turned OFF by the driver.

At a time point t15 after the time point t14, the switching to the decompression stop state from the decompression operating state is performed in response to the IG switch OFF as shown by the solid line in FIG. 5B. According to the decompression devices 26 having the configuration shown in FIG. 2, as already described, the switching to the decompression stop state can be performed without an engine rotation by controlling the actuator 36 such that the engagement between the pin 36a and the retainer 34 is released. This switching may alternatively be performed simultaneously with the IG switch OFF.

It should be noted that, for the purpose of reference, the waveform shown by the broken line in FIG. 5B represents an example of a decompression device having a configuration that requires, contrary to the configuration shown in FIG. 2, an engine rotation to perform the switching from the decompression operating state to the decompression stop state. In the example of this kind of decompression device being included, as shown in FIG. 5B, the crankshaft 42 may be forcibly rotated by the use of the MG 60 in order to perform the switching to the decompression stop state.

As described above, in the example shown in FIG. 5B, even after the engine automatic stop by the S&S control is performed, with respect to the engine stop time after the IG switch 80 is turned OFF, the decompression stop state is maintained to address a possible extremely-cold start-up similarly to the first embodiment. A time point t16 corresponds to a time point at which an extremely-cold start-up is actually started thereafter in response to the IG switch ON. In the course of this engine start-up, the decompression stop state is maintained without performing the switching to the decompression operating state similarly to the first embodiment.

It should be noted that the control of the decompression devices 26 performed when the engine automatic stop and engine start-up based on the operation of the IG switch 80 by the driver are performed is the same as the control according to the first embodiment.

2-2. Processing of ECU Concerning Control of Decompression Device

Figure 6:
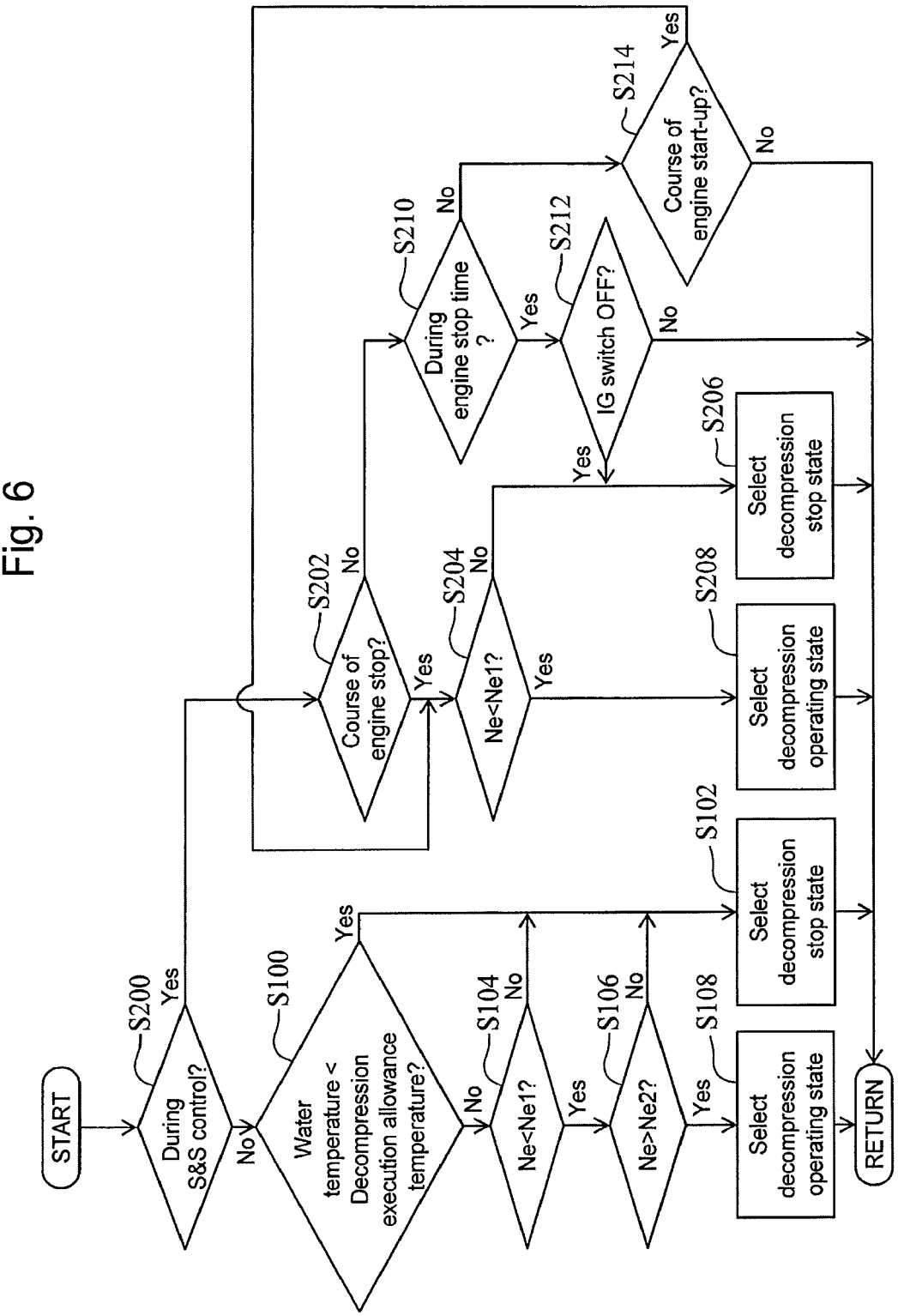
FIG. 6 is a flow chart that illustrates a routine of the processing concerning the control of the decompression device according to the second embodiment of the present disclosure.

FIG. 6 is a flow chart that illustrates a routine of the processing concerning the control of the decompression device 26 according to the second embodiment of the present disclosure. The processing of steps S100 to S108 in the routine shown in FIG. 6 is as already described in the first embodiment.

According to the routine shown in FIG. 6, firstly, the ECU 70 determines whether or not the internal combustion engine 20 is in execution of the S&S control (step S200). As a result, if the determination result of step S200 becomes negative, that is, if the internal combustion engine 20 is in the situation that the engine stop and engine start-up will be performed on the basis of the operation of the IG switch 80 by the driver, the ECU 70 executes the processing of steps S100 to S108.

If, on the other hand, the ECU 70 determines in step S200 that the internal combustion engine 20 is in execution of the S&S control, the ECU 70 proceeds to step S202. In step S202, the ECU 70 determines whether or not the internal combustion engine 20 is in the course of the engine stop by the S&S control.

If the ECU 70 determines in step S202 that the internal combustion engine 20 is in the course of the engine stop, the processing proceeds to step S204. In step S204, the ECU 70 determines, by the same processing as that of step S104, whether or not the engine speed Ne is lower than the engine speed threshold value Ne1.

If, as a result, the determination result of step S204 is negative (Ne≥Ne1), the ECU 70 proceeds to step S206 to control the decompression devices 26 such that the decompression stop state is selected. If, on the other hand, the determination result of step S204 is positive (Ne<Ne1), the ECU 70 proceeds to step S208 to control the decompression devices 26 such that the decompression operating state is selected. According to the processing of steps S204 to S208 (i.e., the processing in the course of the engine stop), the decompression operating state is achieved in the engine speed range (Ne2-Ne1) including the power train resonance range, and the decompression operating state is maintained in the course of the engine stop thereafter.

If, on the other hand, the ECU 70 determines in step S202 that the internal combustion engine 20 is not in the course of the engine stop, the processing proceeds to step S210. In step S210, the ECU 70 determines whether or not the engine stop time that follows the course of the engine stop described above is elapsing.

If the ECU 70 determines in step S210 that the engine stop time is currently elapsing, the processing proceeds to step S212. In step S212, the ECU 70 determines whether or not the IG switch 80 is turned OFF.

If, as a result, the IG switch 80 is not turned OFF, the ECU 70 ends the current processing cycle. As a result, the decompression operating state is maintained. If, on the other hand, the IG switch 80 is turned OFF, the ECU 70 proceeds to step S206 to control the decompression devices 26 such that the switching from the decompression operating state to the decompression stop state is performed.

Moreover, if the ECU 70 determines in step S210 that the engine stop time is not currently elapsing, the processing proceeds to step S214. In step S214, the ECU 70 determines whether or not the internal combustion engine 20 is in the course of the engine start-up that follows the engine stop time described above.

As a result, if the ECU 70 determines in step S214 that the internal combustion engine 20 is in the course of the engine start-up, the processing proceeds to step S204. Because of this, if the determination is made in this way, the processing of steps S204 to S208 is executed. If, on the other hand, the ECU 70 determines in step S214 that the internal combustion engine 20 is not in the course of the engine start-up, it ends the current processing cycle.

2-3. Advantageous Effects Concerning Control of Decompression Device

According to the processing of the routine shown in FIG. 6 described so far, if the engine automatic stop and engine automatic start-up by the S&S control are performed, the decompression operating state is maintained without performing the switching to the decompression stop state after the decompression operating state is selected in the course of the engine stop. Also, the decompression operating state is released after passage of the power train resonance range in the course of the engine start-up thereafter. Because of this, even if the engine automatic stop (i.e., intermittent stop) by the S&S control is often executed, an increase of the number of times of actuation of the decompression devices 26 can be reduced. In addition, in the example of the engine automatic stop by the S&S control, it is conceivable that the restart within a certain time period will be performed as already described. Therefore, under the precondition that the S&S control is executed based on completion of an engine warm-up, even if the internal combustion engine 20 transitions to an engine soak under an extremely-low outside air temperature, the temperature of the decompression devices 26 will be far less likely to be lowered to such a level as to affect the operation of the decompression devices 26 at the time of a subsequent restart.

Furthermore, according to the processing of the routine described above, if the IG switch 80 is turned OFF during an intermittent stop by the S&S control, the switching from the decompression operating state to the decompression stop state is promptly executed. According to this kind of processing, under the condition that, although the engine automatic stop by the S&S control has been performed, the possibility of the extremely-cold start-up being made has increased due to the IG switch 80 being turned OFF during the intermittent stop, the engine startability can be prevented from decreasing due to operation failure of the decompression devices 26.

Other Embodiments 3-1. Other Examples of "Temperature Correlation Value"

In the first and second embodiments described above, the engine water temperature is used as an example of the "temperature correlation value" correlated with the temperature of the decompression device 26. However, examples of the "temperature correlation value" according to the present disclosure may be engine oil temperature (temperature of oil that lubricates an internal combustion engine) or temperature of a battery (e.g., temperature of the battery 64), or be the temperature itself of a decompression device that is directly detected by a sensor, instead of the example of the engine water temperature described above.

3-2. Other Examples of Vehicle

In the first and second embodiments described above, the vehicle 10 which includes the internal combustion engine 20 as its power source and is configured to be able to execute the S&S control is exemplified. However, an example of the vehicle according to the present disclosure may be a hybrid vehicle which includes an electric motor as well as an internal combustion engine as its power source and is configured to be able to execute an engine automatic stop and engine automatic start-up similarly to the S&S control described above. In addition, the vehicle according to the present disclosure including an internal combustion engine may not always be configured to be able to execute the engine automatic stop and engine automatic start-up.

The embodiments and modification examples described above may be combined in other ways than those explicitly described above as required and may be modified in various ways without departing from the scope of the present disclosure.

What is claimed is:

1. A control device for an internal combustion engine, the internal combustion engine including a decompression device configured to select between a decompression operating state in which a decompression operation that releases compression pressure in a cylinder is performed and a decompression stop state in which the decompression operation is not performed,
wherein the control device is configured to:
(a) execute a first decompression operating processing that controls the decompression device such that the decompression operating state is selected in a first engine speed region included in an engine speed region that passes in a course of engine stop;
(b) execute a decompression stop processing that controls the decompression device such that a switching from the decompression operating state to the decompression stop state is performed in the course of the engine stop after passage of the first engine speed region or in an engine stop time after the course of the engine stop;
(c) when a temperature correlation value correlated with temperature of the decompression device is greater than or equal to a threshold value upon an engine start-up request being issued, execute a second decompression operating processing that controls the decompression device such that the decompression operating state is selected in a second engine speed region included in an engine speed region that passes in a course of engine start-up before a start of fuel injection; and
(d) when the temperature correlation value is smaller than the threshold value upon the engine start-up request being issued, cause the second decompression operating processing not to be executed.

2. The control device for an internal combustion engine according to claim 1,
wherein the decompression stop processing is executed where the internal combustion engine is stopped in response to a request to stop a vehicle system from a driver of a vehicle on which the internal combustion engine is mounted.

3. The control device for an internal combustion engine according to claim 1,
wherein the control device is configured to:
(e) execute an engine automatic stop processing that stops the internal combustion engine when an automatic stop condition is met; and
(f) after the internal combustion engine is stopped by the engine automatic stop processing, control the decompression device such that the decompression operating state is maintained in an engine stop time without performing the decompression stop processing.

4. The control device for an internal combustion engine according to claim 3,
wherein the control device is configured, where a request to stop a vehicle system from a driver of a vehicle on which the internal combustion engine is mounted is issued in an engine stop time after stopping the internal combustion engine by the engine automatic stop processing, to control the decompression device such that a switching from the decompression operating state to the decompression stop state is performed.

5. The control device for an internal combustion engine according to claim 1, wherein at least one of the first engine speed region and the second engine speed region includes a power train resonance range.

\* \* \* \* \*